(12) United States Patent
Carrino et al.

(10) Patent No.: US 10,697,788 B2
(45) Date of Patent: Jun. 30, 2020

(54) TERRAIN ANALYSIS FOR AUTOMATIC ROUTE DETERMINATION

(71) Applicant: Palantir Technologies Inc., Palo Alto, CA (US)

(72) Inventors: John Carrino, Menlo Park, CA (US); Joseph Kruse, Nashville, TN (US); Jasmine Peterson, Mountain View, CA (US); Leah Anderson, Richmond, CA (US); Paul Ryan, New York, NY (US); Reese Glidden, Washington, DC (US); Andrew Elder, New York, NY (US); Kevin Ng, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 16/544,429

(22) Filed: Aug. 19, 2019

(65) Prior Publication Data

US 2019/0368886 A1    Dec. 5, 2019

Related U.S. Application Data

(63) Continuation of application No. 16/008,931, filed on Jun. 14, 2018, now Pat. No. 10,429,197.
(Continued)

(51) Int. Cl.
*G01C 21/34* (2006.01)
*G01C 21/20* (2006.01)
*H04W 4/02* (2018.01)

(52) U.S. Cl.
CPC ......... *G01C 21/3461* (2013.01); *G01C 21/20* (2013.01); *H04W 4/02* (2013.01)

(58) Field of Classification Search
CPC ...... G01C 21/3461; G01C 21/20; H04W 4/02
See application file for complete search history.

(56) References Cited

U.S. PATENT DOCUMENTS

| 4,899,161 A | 2/1990 | Morin et al. |
| 4,958,305 A | 9/1990 | Piazza |

(Continued)

FOREIGN PATENT DOCUMENTS

| AU | 2012216622 | 5/2015 |
| DE | 102013222023 | 1/2015 |

(Continued)

OTHER PUBLICATIONS

"A First Look: Predicting Market Demand for Food Retail using a Huff Analysis," TRF Policy Solutions, Jul. 2012, pp. 30.
(Continued)

*Primary Examiner* — Hussein Elchanti
(74) *Attorney, Agent, or Firm* — Sheppard Mullin Richter & Hampton LLP

(57) ABSTRACT

Systems, methods, and non-transitory computer readable media are provided for determining routes within a location. Location information for a location may be obtained. The location information may include terrain information for the location. A set of restricted regions within the location may be determined based on the location information. A set of paths within the location may be determined based on the set of restricted regions. An interface through which information describing the set of paths within the location is accessible may be provided.

18 Claims, 6 Drawing Sheets

Related U.S. Application Data

(60) Provisional application No. 62/677,417, filed on May 29, 2018.

(56) References Cited

U.S. PATENT DOCUMENTS

| | | | |
|---|---|---|---|
| 5,329,108 A | 7/1994 | Lamoure | |
| 5,532,690 A * | 7/1996 | Hertel | B60R 25/04 |
| | | | 180/167 |
| 5,754,182 A | 5/1998 | Kobayashi | |
| 5,781,195 A | 7/1998 | Marvin | |
| 5,781,704 A | 7/1998 | Rossmo | |
| 6,091,956 A | 7/2000 | Hollenberg | |
| 6,157,747 A | 12/2000 | Szeliski et al. | |
| 6,169,552 B1 | 1/2001 | Endo et al. | |
| 6,173,067 B1 | 1/2001 | Payton et al. | |
| 6,178,432 B1 | 1/2001 | Cook et al. | |
| 6,247,019 B1 | 6/2001 | Davies | |
| 6,389,289 B1 | 5/2002 | Voce et al. | |
| 6,414,683 B1 | 7/2002 | Gueziec | |
| 6,483,509 B1 | 11/2002 | Rabenhorst | |
| 6,529,900 B1 | 3/2003 | Patterson et al. | |
| 6,631,496 B1 | 10/2003 | Li et al. | |
| 6,662,103 B1 | 12/2003 | Skolnick et al. | |
| 6,757,445 B1 | 6/2004 | Knopp | |
| 6,828,920 B2 | 12/2004 | Owen et al. | |
| 6,983,203 B1 | 1/2006 | Wako | |
| 6,985,950 B1 | 1/2006 | Hanson et al. | |
| 7,036,085 B2 | 4/2006 | Barros | |
| 7,158,878 B2 | 1/2007 | Rasmussen et al. | |
| 7,375,732 B2 | 5/2008 | Arcas | |
| 7,379,811 B2 | 5/2008 | Rasmussen et al. | |
| 7,457,706 B2 | 11/2008 | Malero et al. | |
| 7,502,786 B2 | 3/2009 | Liu et al. | |
| 7,519,470 B2 | 4/2009 | Brasche et al. | |
| 7,529,195 B2 | 5/2009 | Gorman | |
| 7,539,666 B2 | 5/2009 | Ashworth et al. | |
| 7,558,677 B2 | 7/2009 | Jones | |
| 7,574,428 B2 | 8/2009 | Leiserowitz et al. | |
| 7,579,965 B2 | 8/2009 | Bucholz | |
| 7,617,314 B1 | 11/2009 | Bansod et al. | |
| 7,620,628 B2 | 11/2009 | Kapur et al. | |
| 7,663,621 B1 | 2/2010 | Allen et al. | |
| 7,791,616 B2 | 9/2010 | Ioup et al. | |
| 7,805,457 B1 | 9/2010 | Viola et al. | |
| 7,809,703 B2 | 10/2010 | Balabhadrapatruni et al. | |
| 7,872,647 B2 | 1/2011 | Mayer et al. | |
| 7,894,984 B2 | 2/2011 | Rasmussen et al. | |
| 7,899,611 B2 | 3/2011 | Downs et al. | |
| 7,920,963 B2 | 4/2011 | Jouline et al. | |
| 7,945,852 B1 | 5/2011 | Pilskains | |
| 7,962,281 B2 | 6/2011 | Rasmussen et al. | |
| 7,970,240 B1 | 6/2011 | Chao et al. | |
| 8,010,545 B2 | 8/2011 | Stefik et al. | |
| 8,036,632 B1 | 10/2011 | Cona et al. | |
| 8,065,080 B2 | 11/2011 | Koch | |
| 8,085,268 B2 | 12/2011 | Carrino et al. | |
| 8,134,457 B2 | 3/2012 | Velipasalar et al. | |
| 8,145,703 B2 | 3/2012 | Frishert et al. | |
| 8,200,676 B2 | 6/2012 | Frank | |
| 8,214,361 B1 | 7/2012 | Sandler et al. | |
| 8,214,764 B2 | 7/2012 | Gemmell et al. | |
| 8,229,947 B2 | 7/2012 | Fujinaga | |
| 8,230,333 B2 | 7/2012 | Decherd et al. | |
| 8,290,942 B2 | 10/2012 | Jones et al. | |
| 8,290,943 B2 | 10/2012 | Carbone et al. | |
| 8,301,464 B1 | 10/2012 | Cave et al. | |
| 8,325,178 B1 | 12/2012 | Doyle, Jr. | |
| 8,368,695 B2 | 2/2013 | Howell et al. | |
| 8,397,171 B2 | 3/2013 | Klassen et al. | |
| 8,400,448 B1 | 3/2013 | Doyle, Jr. | |
| 8,407,180 B1 | 3/2013 | Ramesh et al. | |
| 8,412,234 B1 | 4/2013 | Gatmir-Motahari et al. | |
| 8,412,707 B1 | 4/2013 | Mianji | |
| 8,422,825 B1 | 4/2013 | Neophytou et al. | |
| 8,452,790 B1 | 5/2013 | Mianji | |
| 8,463,036 B1 | 6/2013 | Ramesh et al. | |
| 8,489,331 B2 | 7/2013 | Kopf et al. | |
| 8,489,641 B1 | 7/2013 | Seefeld et al. | |
| 8,498,984 B1 | 7/2013 | Hwang et al. | |
| 8,508,533 B2 | 8/2013 | Cervelli et al. | |
| 8,514,229 B2 | 8/2013 | Cervelli et al. | |
| 8,515,207 B2 | 8/2013 | Chau | |
| 8,564,596 B2 | 10/2013 | Carrino et al. | |
| 8,742,934 B1 | 6/2014 | Sarpy et al. | |
| 8,781,169 B2 | 7/2014 | Jackson et al. | |
| 8,799,799 B1 | 8/2014 | Cervelli et al. | |
| 8,830,322 B2 | 9/2014 | Nerayoff et al. | |
| 8,938,686 B1 | 1/2015 | Erenrich et al. | |
| 8,949,164 B1 | 2/2015 | Mohler | |
| 8,983,494 B1 | 3/2015 | Onnen et al. | |
| 9,009,177 B2 | 4/2015 | Zheng et al. | |
| 9,021,384 B1 | 4/2015 | Beard et al. | |
| 9,104,293 B1 | 8/2015 | Kornfeld et al. | |
| 9,104,695 B1 | 8/2015 | Cervelli et al. | |
| 9,111,380 B2 | 8/2015 | Piemonte et al. | |
| 9,129,219 B1 | 9/2015 | Robertson et al. | |
| 9,146,125 B2 | 9/2015 | Vulcano et al. | |
| 9,280,618 B1 | 3/2016 | Bruce et al. | |
| 10,429,197 B1 * | 10/2019 | Carrino | G01C 21/20 |
| 2002/0003539 A1 | 1/2002 | Abe | |
| 2002/0033848 A1 | 3/2002 | Sciammarella et al. | |
| 2002/0116120 A1 | 8/2002 | Ruiz et al. | |
| 2002/0130867 A1 | 9/2002 | Yang et al. | |
| 2002/0130906 A1 | 9/2002 | Miyaki | |
| 2003/0052896 A1 | 3/2003 | Higgins et al. | |
| 2003/0103049 A1 | 6/2003 | Kindratenko et al. | |
| 2003/0144868 A1 | 7/2003 | MacIntyre et al. | |
| 2003/0163352 A1 | 8/2003 | Surpin et al. | |
| 2003/0225755 A1 | 12/2003 | Iwayama et al. | |
| 2004/0007121 A1 | 1/2004 | Graves et al. | |
| 2004/0030492 A1 | 2/2004 | Fox et al. | |
| 2004/0039498 A1 | 2/2004 | Ollis et al. | |
| 2004/0098236 A1 | 5/2004 | Mayer et al. | |
| 2005/0031197 A1 | 2/2005 | Knopp | |
| 2005/0034062 A1 | 2/2005 | Bufkin et al. | |
| 2005/0080769 A1 | 4/2005 | Gemmell | |
| 2005/0143602 A1 | 6/2005 | Yada et al. | |
| 2005/0162523 A1 | 7/2005 | Darrell et al. | |
| 2005/0182502 A1 | 8/2005 | Iyengar | |
| 2005/0182793 A1 | 8/2005 | Keenan et al. | |
| 2005/0223044 A1 | 10/2005 | Ashworth et al. | |
| 2005/0267652 A1 | 12/2005 | Allstadt et al. | |
| 2006/0026170 A1 | 2/2006 | Kreitler et al. | |
| 2006/0139375 A1 | 6/2006 | Rasmussen et al. | |
| 2006/0146050 A1 | 7/2006 | Yamauchi | |
| 2006/0149596 A1 | 7/2006 | Surpin et al. | |
| 2006/0200384 A1 | 9/2006 | Arutunian et al. | |
| 2006/0251307 A1 | 11/2006 | Florin et al. | |
| 2006/0259527 A1 | 11/2006 | Devarakonda et al. | |
| 2006/0271277 A1 | 11/2006 | Hu et al. | |
| 2006/0279630 A1 | 12/2006 | Aggarwal et al. | |
| 2007/0011150 A1 | 1/2007 | Frank | |
| 2007/0016363 A1 | 1/2007 | Huang et al. | |
| 2007/0024620 A1 | 2/2007 | Muller-Fischer et al. | |
| 2007/0057966 A1 | 3/2007 | Ohno et al. | |
| 2007/0078832 A1 | 4/2007 | Ott et al. | |
| 2007/0115373 A1 | 5/2007 | Gallagher et al. | |
| 2007/0188516 A1 | 8/2007 | Loup et al. | |
| 2007/0208497 A1 | 9/2007 | Downs et al. | |
| 2007/0208498 A1 | 9/2007 | Barker et al. | |
| 2007/0258642 A1 | 11/2007 | Thota | |
| 2007/0294643 A1 | 12/2007 | Kyle | |
| 2008/0010605 A1 | 1/2008 | Frank | |
| 2008/0040684 A1 | 2/2008 | Crump | |
| 2008/0077642 A1 | 3/2008 | Carbone et al. | |
| 2008/0082578 A1 | 4/2008 | Hogue et al. | |
| 2008/0098085 A1 | 4/2008 | Krane et al. | |
| 2008/0104019 A1 | 5/2008 | Nath | |
| 2008/0133120 A1 * | 6/2008 | Romanick | G01C 21/3469 |
| | | | 701/123 |
| 2008/0133579 A1 | 6/2008 | Lim | |
| 2008/0163073 A1 | 7/2008 | Becker et al. | |
| 2008/0192053 A1 | 8/2008 | Howell et al. | |

(56) References Cited

U.S. PATENT DOCUMENTS

| | | |
|---|---|---|
| 2008/0195417 A1 | 8/2008 | Surpin et al. |
| 2008/0223834 A1 | 9/2008 | Griffiths et al. |
| 2008/0229056 A1 | 9/2008 | Agarwal et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shmiasaki et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford |
| 2010/0057358 A1* | 3/2010 | Winer ............... G01C 21/3407 701/414 |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0162176 A1 | 6/2010 | Dunton |
| 2010/0185692 A1 | 7/2010 | Zhang et al. |
| 2010/0198684 A1 | 8/2010 | Eraker et al. |
| 2010/0199225 A1 | 8/2010 | Coleman et al. |
| 2010/0277611 A1 | 11/2010 | Holt et al. |
| 2010/0293174 A1 | 11/2010 | Bennett et al. |
| 2010/0321399 A1 | 12/2010 | Ellren et al. |
| 2011/0022312 A1 | 1/2011 | McDonough et al. |
| 2011/0090254 A1 | 4/2011 | Carrino et al. |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0270705 A1 | 11/2011 | Parker |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0144335 A1 | 6/2012 | Abeln et al. |
| 2012/0158527 A1 | 6/2012 | Cannelongo et al. |
| 2012/0159363 A1 | 6/2012 | DeBacker et al. |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221580 A1 | 8/2012 | Barney |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0100134 A1 | 4/2013 | Cervelli et al. |
| 2013/0101159 A1 | 4/2013 | Chao et al. |
| 2013/0132398 A1 | 5/2013 | Pfiefle |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0254900 A1 | 9/2013 | Sathish et al. |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0339891 A1 | 12/2013 | Blumenberg et al. |
| 2014/0176606 A1 | 6/2014 | Narayan et al. |
| 2014/0218400 A1 | 8/2014 | O'Toole et al. |
| 2014/0278056 A1* | 9/2014 | Williams ........... G01C 21/3476 701/410 |
| 2014/0333651 A1 | 11/2014 | Cervelli et al. |
| 2014/0337772 A1 | 11/2014 | Cervelli et al. |
| 2014/0361899 A1 | 12/2014 | Layson |
| 2015/0029176 A1 | 1/2015 | Baxter et al. |
| 2015/0100907 A1 | 4/2015 | Erenrich et al. |
| 2015/0106170 A1 | 4/2015 | Bonica |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0312323 A1 | 10/2015 | Peterson |
| 2015/0338233 A1 | 11/2015 | Cervelli et al. |
| 2015/0379413 A1 | 12/2015 | Robertson et al. |
| 2016/0223350 A1* | 8/2016 | Lewis ................ G01C 21/3407 |
| 2017/0046960 A1* | 2/2017 | Bernhardt ............ G08G 5/0086 |
| 2017/0176193 A1* | 6/2017 | Chau ................... G01C 21/206 |
| 2018/0017973 A1* | 1/2018 | Teague ................. B64C 39/024 |

FOREIGN PATENT DOCUMENTS

| | | |
|---|---|---|
| EP | 0 763 201 | 3/1997 |
| EP | 2 575 107 | 4/2013 |
| EP | 2858014 | 4/2015 |
| EP | 2963595 | 1/2016 |
| GB | 2516155 | 1/2015 |
| NL | 2012778 | 11/2014 |
| NZ | 624557 | 12/2014 |
| WO | WO 95/032424 | 11/1995 |
| WO | WO 2000/009529 | 2/2000 |
| WO | WO 2001/098925 | 12/2001 |
| WO | WO 2004/057268 | 7/2004 |
| WO | WO 2005/013200 | 2/2005 |
| WO | WO 2008/064207 | 5/2008 |
| WO | WO 2009/061501 | 5/2009 |
| WO | WO 2009/123975 | 10/2009 |
| WO | WO 2011/058507 | 5/2011 |
| WO | WO-2018/053277 | 3/2018 |

OTHER PUBLICATIONS

"Andy Turner's GISRUK 2012 Notes" <https://docs.google.com/document/d/1cTmxg7mVx5gd89lqbICYvCEnHA4QAivH4I4WpyPsqE4/edit?pli=1> printed Sep. 16, 2013 in 15 pages.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

Barnes et al., "Viewshed Analysis", GIS-ARC/INFO 2001, <www.evsc.virginia.edu/~jhp7e/evsc466/student_pres/Rounds.pdf>.

Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Definition "Identify", downloaded Jan. 22, 2015, 1 page.

Definition "Overlay", downloaded Jan. 22, 2015, 1 page.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Ghosh, P., "A Solution of Polygon Containment, Spatial Planning, and Other Related Problems Using Minkowski Operations," Computer Vision, Graphics, and Image Processing, 1990, vol. 49, pp. 1-35.

(56) References Cited

OTHER PUBLICATIONS

GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.

Gorr et al., "Crime Hot Spot Forecasting: Modeling and Comparative Evaluation", Grant 98-IJ-CX-K005, May 6, 2002, 37 pages.

Griffith, Daniel A., "A Generalized Huff Model," Geographical Analysis, Apr. 1982, vol. 14, No. 2, pp. 135-144.

Haralick et al., "Image Analysis Using Mathematical Morphology," Pattern Analysis and Machine Intelligence, IEEE Transactions, Jul. 1987, vol. PAMI-9, No. 4, pp. 532-550.

Hibbert et al., "Prediction of Shopping Behavior Using a Huff Model Within a GIS Framework," Healthy Eating in Context, Mar. 18, 2011, pp. 16.

Huang et al., "Systematic and Integrative Analysis of Large Gene Lists Using David Bioinformatics Resources," Nature Protocols, 4.1, 2008, 44-57.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

Ipbucker, C., "Inverse Transformation for Several Pseudo-cylindrical Map Projections Using Jacobian Matrix," ICCSA 2009, Part 1 LNCS 5592, pp. 553-564.

Levine, N., "Crime Mapping and the Crimestat Program," Geographical Analysis, 2006, vol. 38, pp. 41-56.

Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Mandagere, Nagapramod, "Buffer Operations in GIS," <http://www-users.cs.umn.edu/~npramod/enc_pdf.pdf> retrieved Jan. 28, 2010, pp. 7.

Map Builder, "Rapid Mashup Development Tool for Google and Yahoo Maps!" <http://web.archive.org/web/20090626224734/http://www.mapbuilder.net/<printed Jul. 20, 2012 in 2 pages.

Map of San Jose, CA. Retrieved Oct. 2, 2013 from http://maps.yahoo.com.

Map of San Jose, CA. Retrieved Oct. 2, 2013 from http://maps.bing.com.

Map of San Jose, CA. Retrieved Oct. 2, 2013 from http://maps.google.com.

Murray, C., Oracle Spatial Developer's Guide-6 Coordinate Systems (Spatial Reference Systems), <http://docs.oracle.com/cd/B28359_01/appdev.111/b28400.pdf>, Jun. 2009.

Open Street Map, "Amm's Diary:Unconnected ways and other data quality issues," http://www.openstreetmap.org/user/amm/diary printed Jul. 23, 2012 in 3 pages.

POI Editor, "How to: Create Your Own Points of Interest," <http://www.poieditor.com/articles/how_to_create_your_own_points_of_interest/>printed Jul. 22, 2012 in 4 pages.

Pozzi et al., "Vegetation and Population Density in Urban and Suburban Areas in the U.S.A." Third International Symposium of Remote Sensing of Urban Areas Istanbul, Turkey, Jun. 2002, pp. 8.

Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.

Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.

Reibel et al., "Areal Interpolation of Population Counts Using Pre-classi_ed Land Cover Data," Population Research and Policy Review, 2007, vol. 26, pp. 619-633.

Reibel, M., "Geographic Information Systems and Spatial Data Processing in Demography: a Review," Population Research and Policy Review, 2007, vol. 26, pp. 601-618.

Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.

Snyder, "Map Projections—A Working Manual," U.S. Geological Survey Professional paper 1395, United States Government Printing Office, Washington: 1987, pp. 11-21 and 60-70.

Sonris, "Using the Area of Interest Tools," <http://web.archive.org/web/20061001053327/http://sonris-www.dnr.state.la.us/gis/instruct_files/tutslide12> printed Jan. 3, 2013 in 1 page.

Tangelder et al., "Freeform Shape Matching Using Minkowski Operations," The Netherlands, Jun. 1996, pp. 12.

Thompson, Mick, "Getting Started with GEO," Getting Started with GEO, Jul. 26, 2011.

Valentini et al., "Ensembles of Learning Machines", M. Marinaro and R. Tagliaferri (Eds.): WIRN VIETRI 2002, LNCS 2486, pp. 3-20.

VB Forums, "Buffer A Polygon," Internet Citation, <http://www.vbforums.com/showthread.php?198436-Buffer-a-Polygon>, Specifically Thread #1, #5 & #11 retrieved on May 2, 2013, pp. 8.

Vivid Solutions, "JTS Topology Suite: Technical Specifications," <http://www.vividsolutions.com/jts/bin/JTS%20Technical%20Specs.pdf> Version 1.4, 2003, pp. 36.

Wikipedia, "Douglas_Peucker-Algorithms," <http://de.wikipedia.org/w/index.php?title=Douglas-Peucker-Algorithmus&oldid=91846042> printed Jul. 2011, pp. 2.

Wikipedia, "Ramer_Douglas_Peucker Algorithm," <http://en.wikipedia.org/wiki/Ramer%E2%80%93Douglas%E2%80%93Peucker_algorithm> printed Jul. 2011, pp. 3.

Wongsuphasawat et al., "Visual Analytics for Transportation Incident Data Sets," Transportation Research Record 2138, 2009, pp. 135-145.

Woodbridge, Stephen, "[geos-devel] Polygon simplification," <http://lists.osgeo.org/pipermail/geos-devel/2011-May/005210.html> dated May 8, 2011, pp. 3.

Extended European Search Report for EP Appln. No. 19177108.8 dated Jan. 14, 2020, 8 pages.

Selim et al., "Extending Land Navigation Applications to Support Off Road Based on Elevation and Land Characteristics", Vehicular Electronics and Safety (ICVES), 2010 IEEE International Conference, Piscataway, NJ, USA, Jul. 15, 2020, pp. 365-372.

* cited by examiner

TERRAIN ANALYSIS FOR AUTOMATIC ROUTE DETERMINATION

CROSS REFERENCE TO RELATED APPLICATIONS

This application is a continuation of U.S. Ser. No. 16/008,937, filed Jun. 14, 2018, which claims the benefit under 35 U.S.C. § 119(e) of U.S. Provisional Application Ser. No. 62/677,417, filed May 29, 2018, the content of which is incorporated by reference in its entirety into the present disclosure.

FIELD OF THE INVENTION

This disclosure relates to approaches for automatically determining routes based on terrain analysis.

BACKGROUND

Under conventional approaches, information relating to terrain of a location may be presented to a user to determine potential paths within the location. Such path determination may be imprecise and may not account for all possible paths within the location.

SUMMARY

Various embodiments of the present disclosure may include systems, methods, and non-transitory computer readable media configured to determine routes within a location. Various embodiments of the present disclosure may include systems, methods, and non-transitory computer readable media configured to obtain location information for a location. The location information may include terrain information and/or other information for the location. One or more sets of restricted regions within the location may be determined based on the location information and/or other information. One or more sets of paths within the location may be determined based on the set(s) of restricted regions and/or other information. An interface through which information describing the set(s) of paths within the location is accessible may be provided.

In some embodiments, the terrain information may define elevations of one or more terrains within the location and the set(s) of restricted regions within the location may be determined based on changes in the elevations of the terrain(s) within the location.

In some embodiments, a boundary of a restricted region within the set(s) of restricted regions may trace a line of a given slope within the terrain(s). The given slope may be defined by a single value or a range of values meeting a threshold. The given slope may be determined based on a type of an entity that is expected to traverse one or more paths of the set(s) of paths.

In some embodiments, the location information may further include restriction information for the location. The restriction information may define one or more restricted regions within the location.

In some embodiments, the set(s) of paths may be determined based on a straight skeleton analysis of the set(s) of restricted regions within the location.

In some embodiments, the set(s) of paths may be determined based on distances between one or more boundaries of the set(s) of restricted regions meeting a distance threshold. The distance threshold may be determined based on a type of an entity that is expected to traverse one or more paths of the set(s) of paths.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
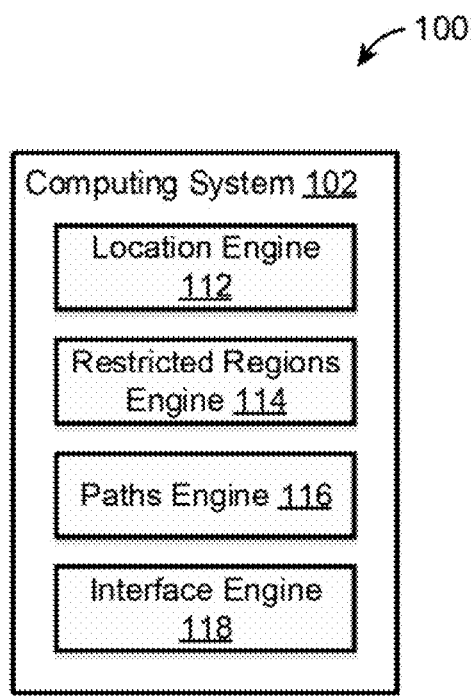
FIG. 1 illustrates an example environment for determining routes within a location, in accordance with various embodiments.

A claimed solution rooted in computer technology overcomes problems specifically arising in the realm of computer technology. Location information for a location may be obtained. The location information may include terrain information for the location. A set of restricted regions within the location may be determined based on the location information. For example, the terrain information may define elevations of a terrain within the location and the set of restricted regions within the location may be determined based on changes in the elevations (e.g., slopes) of the terrain within the location. A boundary of a restricted region within the set of restricted regions may trace a line of a given slope within the terrain. The given slope may be defined by a single value (e.g., a particular slope) or a range of values meeting one or more thresholds (e.g., slopes steeper than a threshold slope). The given slope may be determined based on a type of an entity (e.g., person, animal, team, vehicle) that is expected to traverse one or more paths of the set of paths. In some instances, the location information may also include restriction information for the location. The restriction information may define one or more restricted regions within the location such as a user-defined restricted region and the set of restricted regions may include the restricted region(s) defined by the restriction information.

A set of paths within the location may be determined based on the set of restricted regions. For example, the set of paths may be determined based on a straight skeleton analysis of the set of restricted regions within the location. The straight skeleton analysis may determine a topological skeleton of the location, and the set of paths may follow one or more portions of the topological skeleton of the location. As another example, the set of paths may be determined based on distances between one or more boundaries of the set of restricted regions meeting a distance threshold. The distance threshold may be determined based on a type (or size) of an entity that is expected to traverse one or more paths of the set of paths.

An interface for accessing information describing the set of paths within the location may be provided. The interface may enable a user to view and/or select one or more paths within the set of paths. The interface may provide visualization of costs (e.g., temporal costs, non-temporal costs) for an entity to traverse one or more paths within the set of paths. The paths visualized within the interface may be filtered using heuristics to provide a cleaner and more useful visualization of the paths. The interface may provide visualization of the set of paths in view of the set of restricted regions within the location. For example, the set of paths and the set of restricted regions may be visualized using one or more buffers. Buffers may be associated with a type of an entity that is expected to traverse one or more paths of the set of paths. These buffers may be defined automatically or manually. The interface may provide visualization of the terrains within the location, such as visualization of different slopes of the terrains within the location. Further, the interface may enable a user to set one or more points along a route, such as a starting point, an ending point, and/or one or more intermediate points (e.g., waypoints). The interface may provide visualization of routes that may be taken within the location, such as a shortest route between different points within the location and/or a visual representation of how far an entity may travel based on different durations of travel time.

The approaches disclosed herein enable determination of potential routes within a location by taking into account different elevations within the location. The route determination may include automatic analysis of terrains within the location, such as analysis of different slopes within the location. The slopes within the location may be used to determine the paths that may be traversed by an entity within the location.

FIG. 1 illustrates an example environment 100 for determining routes within a location, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a location engine 112, a restricted regions engine 114, a paths engine 116, an interface engine 118, and/or other engines. While the computing system 102 is shown in FIG. 1 as a single entity, this is merely for ease of reference and is not meant to be limiting. One or more components/ functionalities of the computing system 102 described herein may be implemented, in whole or in part, within a single computing device or within multiple computing devices.

In various embodiments, the location engine 112 is configured to obtain location information for a location. Obtaining location information may include accessing, acquiring, analyzing, determining, examining, identifying, loading, locating, opening, receiving, retrieving, reviewing, storing, and/or otherwise obtaining the location information. Location information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Location information may be obtained from one or more databases. Location information may be stored within a single file or across multiple files. For example, location information for a location may have been ingested into a database as one or more objects, and the location engine 112 may retrieve the object(s) to obtain the location information.

In some embodiments, the location engine 112 may obtain location information for a location based on a user's interaction with a user interface. The user interface may enable a user to enter and/or select one or more locations for which location information is to be obtained. For example, the user interface may enable a user to enter a name, identifier, geographic coordinates and/or other information that identifies and/or is associated with a location, and the location engine 112 may obtain location information for the location based on the information entered by the user. As another example, the user interface may display a view (e.g., satellite map, street map, topographical map, climate map, etc.) of a geographic area. The user interface may enable a user to select one or more locations, such as by clicking/tagging a location and/or drawing a shape that defines the location, and the location engine 112 may obtain location information for the selected location.

A location may refer to a geographic area within which one or more of the entities may move (or travel) and/or may be expected to move. An entity may refer to one or more living and/or non-living things with distinct existence. For example, an entity may refer to one or more persons, one or more animals, one or more teams, one or more vehicles, one or more organizations, and/or other single things or groups of things. An entity may be associated with one or more modes of travel. A mode of travel may refer to a way or a manner by which an entity may move. For example, an entity comprised of a team of persons may be associated with one or more of the following modes of travel: land movement, air movement, water movement, movement on foot, and movement on vehicle.

Location information may refer to information that describes a location. Location information may describe physical and/or non-physical aspects of the location. For example, location information may include terrain information for a location. A terrain may refer to a defined region within a location. A terrain may be defined based on its physical features, such as natural features of the terrain and/or individuals, structures, and/or vehicles on/above/ below the terrain. Terrain information for a location may characterize one or more terrains within the location, such as by defining types of terrains within the location and/or geographic/physical features of terrains within the location.

For example, terrain information may define elevations of one or more terrains within the location. Terrain information defining elevations of a terrain may include the terrain information including values that specify elevations of a terrain at different coordinate locations and/or values that specify changes in elevation (slope, steepness) of a terrain at different coordinate locations. As another example, terrain information may define types of the terrain, such as whether the surface of a terrain is dry/wet/frozen, what material(s) make up the terrain, and/or what material(s) cover the terrain (e.g., sand, rocks, water, snow). As yet another example, terrain information may define how easy and/or difficult it may be for an entity to traverse across the terrain, such as whether the terrain is slippery/not slippery, whether solid footing may be found on the terrain, and/or whether one or more travel tools (e.g., pitons for climbing, chains on vehicle wheels) may be used to facilitate movement across in the terrain. As further example, terrain information may define one or more environmental conditions of one or more terrains within the location. Environmental conditions may refer to conditions relating to the natural world and/or their impact on one or more entities. For example, an environmental condition of a location may include one or more of a weather condition, a wind condition, a temperature condition, and/or other natural world conditions. Other types of terrain information are contemplated.

In some embodiments, location information may include restriction information for a location. The restriction information may define one or more restricted regions within the location. For example, the restriction information may define where restricted region(s) are located within the location, may define shape and/or size of restricted region(s) within the location, and/or other information relating to restricted region(s) within the location. For instance, the restriction information may define one or more user-defined restricted regions within the location. A user-defined restricted region may refer to a region, defined by a user (e.g., by drawing a polygon in a map representation of the location), into and/or across which an entity may not/should not move. Other types of location information are contemplated.

In various embodiments, the restricted regions engine 114 is configured to determine one or more sets of restricted regions within the location based on the location information and/or other information. A set of restricted regions may include one or more restricted regions. A restricted region may refer to a region into and/or across which an entity may not/should not move. A restricted region may be defined in one dimension (e.g., a line that should not be crossed by an entity), defined in two dimensions (e.g., width and length of an area that an entity cannot/should not enter), defined in three dimensions (e.g., width, length, and height of an area that an entity cannot/should not enter), defined in four dimensions (e.g., width, length, and/or highest of an area that an entity cannot/should not enter at certain times), and/or other dimensions. The restricted regions engine 114 may determine the restricted region(s) within the location based on information that describes the location.

For example, location information for a location may include terrain information that defines elevations of one or more terrains within the location, and the restricted regions engine 114 may determine the restricted region(s) based on changes in the elevations of the terrain(s) within the location. For instance, the location information may provide a digital elevation model of the location and the restricted regions engine 114 may determine which regions may not/should not be traversed by one or more entities based on the slope of the terrain(s) within the location. For example, a slope of 25% (rise over run of one to four) may be considered too steep for an entity to traverse and the restricted regions engine 114 may determine restricted region(s) based on which portions of the location includes a slope of 25% (and/or higher).

In some embodiments, a boundary of a restricted region within the set(s) of restricted regions may trace a line of a given slope within the terrain(s). The given slope may be defined by a single value (e.g., a particular slope) or a range of values meeting one or more thresholds (e.g., slopes steeper than a threshold slope). For example, based on the slope of 25% being considered too steep for traversal, the restricted regions engine 114 may determine restricted region(s) by outputting polygons that trace lines of 25% slope (and/or slope greater than 25%). In some embodiments, the given slope for restriction region determination may be determined based on a type of an entity that is expected to traverse one or more paths within the location. A type of an entity may refer to a category into which the entity falls. A type of an entity may include categories that depend on the nature of the entity (e.g., person, animal, vehicle), categories that depend on the physical size of the entity (e.g., motorcycle, sedan, truck), and categories that depend on the numerical size of the entity (e.g., individual, team of a certain number of persons, a group of teams). For example, the value of the slope used to determine the restricted regions may be smaller for a person than it may be for an off-road vehicle.

In some embodiments, other location information may be used to determine one or more sets of restricted regions within the location and/or to supplement the determination of restricted regions based on slopes. For example, the location information may include restriction information that defines one or more restricted regions (e.g., user-defined restricted regions) within the location and the set of restricted regions determined by the restricted regions engine 114 may include the restricted region(s) defined by the restriction information. Such determination of restricted regions may provide for addition of custom restricted regions in the location. Such restricted regions may not include a slope that prevents an entity's traversal within the region but may include regions that the entity may/should avoid (e.g., swamps, dangerous areas). As another example, the terrain information may define other aspects of the location (e.g., terrain type, ease/difficulty of traversal, environmental condition) that may be used to supplement the determination of restricted regions based on slopes. For instance, the given slope by which the restricted regions may be changed based on the surface type of the terrain (e.g., higher slope for dry terrain, lower slope for terrain with high winds). Various combinations of location information for restricted region determination are contemplated.

In various embodiments, the paths engine 116 is configured to determine one or more sets of paths within the location based on the set(s) of restricted regions and/or other information. That is, based on the set(s) of restricted regions determined by the restricted regions engine 114, the paths engine 116 may determine pathways for one or more entities to traverse. A set of paths may include one or more paths. A path may refer to a way or a route by which an entity may move (or travel) within the location. A path may include one or more straight portions and/or one or more non-straight portions. The paths engine 116 may determine the path(s) so that a path does not collide with a restricted region. For example, a path may be determined by the paths engine 116 so that the path does not touch, run into, and/or run across any of the restricted region(s) within the location.

In some embodiments, the paths engine 116 may determine the set(s) of paths based on a straight skeleton analysis of the set(s) of restricted regions within the location. A straight skeleton analysis may determine a topological skeleton of the location, and the set of paths may follow one or more portions of the topological skeleton of the location. A topological skeleton of a shape may refer to a shape/line(s)/segment(s) that is equidistant to the boundaries of the shape. For example, for a location, the boundaries of the restricted regions may be treated as polygon that are subtracted from a shape of the location. That is, the restricted regions may be treated as holes within the shape of the location. The topological skeleton of the location may then be determined as those portions within the shape of the location which are equidistant from the edges of the holes.

In some embodiments, the paths engine 116 may determine the set(s) of paths based on distances between one or more boundaries of the set(s) of restricted regions meeting a distance threshold. For example, a boundary of a restricted region or multiple boundaries of multiple restricted regions may outline the shape of an area that may potentially be traversed by an entity. The paths engine 116 may determine whether a path for an entity will go through such an area based on whether the area can accommodate the entity (e.g., the area is wide enough for the entity). For example, boundaries of two restricted regions may outline an hour-glass shaped area that may potentially be traversed by an entity. Whether a path going from one end of the hour-glass shaped area, through the narrow area, to the other end of the hour-glass shaped area may depend on whether the narrow area is wide enough to accommodate the entity. The paths engine 116 may determine whether such a path will be determined by comparing the distance between the shape of the area (e.g., width of the area) with a distance threshold for an entity. A distance threshold may refer to a distance value or a range of distance values that must be met by an area for a path to be determined (e.g., drawn) through the area. That is, a distance threshold may define one or more sizes (e.g., widths) of a non-restricted area that are needed for an entity to travel over the area. The distance threshold may be determined based on a type of an entity that is expected to traverse one or more paths within the location. For instance, the distance threshold for an individual person may be smaller than the distance threshold for a group of persons. As another example, the distance threshold for a team of people traveling on a truck may be different than the distance threshold for a team of people traveling on motorcycles. Other distance threshold determinations based on entity types are contemplated.

In some embodiments, the paths engine 116 may determine the set(s) of paths by taking into account changes in the entity. For example, a movement of an entity within a location may include one or more changes in physical size, number size, and/or travel mode of the entity, such as an entity of a team of people splitting up into smaller groups and/or an entity changing the mode of travel from riding a car to hiking on foot. The paths engine 116 may determine one or more paths and/or one or more portions of paths to account for such changes in the entity. In some embodiments, the paths engine 116 may determine one or more paths based on potential changes in the entity. For example, based on the type of the entity and the location of restricted regions within the location, the paths engine 116 may determine a limited number of paths for the entity. The paths engine 116 may also determine additional paths that may be used if the entity changes before and/or during the traversal within the location (such as changing the physical size, number size, and/or travel mode of the entity).

In various embodiments, the interface engine 118 is configured to provide one or more interfaces through information describing the set(s) of paths within the location is accessible. The interface(s) may include application program interface(s) (APIs) and/or user interface(s). For example, the interface engine 118 may provide (e.g., make available for use, supply) one or more APIs that may be used by users/computing systems to access information describing the set(s) of paths within the location. As another example, the interface engine 118 may provide (e.g., generate, present) one or more user interfaces (e.g., web user interface accessible through a browser) through which users may view the information describing the set(s) of paths within the location.

An interface provided by the interface engine 118 may enable a user to view and/or select one or more paths within the set of paths. For example, the interface may provide a map view of the location with the path(s) determined by the paths engine 116 shown within the map view. Such a view may provide visualization of the set(s) of paths in view of the set(s) of restricted regions within the location. The visualization of the path(s) within the location may provide an automated route analysis within the location. That is, the visualization of the path(s) within the location may indicate where an entity may travel within the location based on distances between one or more boundaries of restricted regions within the location and/or based on a distance threshold of the entity. The selection of a particular path may prompt the interface engine 118 to retrieve and/or provide information relating to the selected path. For example, the selection of a path may return information relating to traversal of the path by an entity, such as the time expected to take to traverse the path. As another example, the visualization of a path and/or provision of information responsive to selection of a path may include provision of information relating to past traversal of the path by an entity, such as where on the path the entity was located at different times. In some embodiments, historical data relating to traversal of paths by one or more entities may be used to simulate how the same or different entities may traverse a given path within a location.

In some embodiments, the paths visualized within the interface may be filtered using heuristics to provide a cleaner and more useful visualization of the paths. Providing visualization of all paths determined by the paths engine 116 may create a cluttered view of the location. That is, there may be too many paths within the location and presentation of all paths may make it difficult to see and/or understand the paths available to be taken by an entity. For example, paths that have a degree of one (touches an exterior vertex) may be removed from view. Such removal of paths may preserve corridor paths within the location that circle the holes (restricted regions) within the shape of the location and connect the paths that circle the holes. As another example, paths within a funnel-shaped area of the location (the shape defined by the boundaries of the restricted region(s)) may be filtered so that edge paths are removed. As a further example, paths within an hour-glass shaped area of the location may be filtered to keep a path that runs from one end of the hour-glass to the other end of the hour-glass. Such a path may provide visualization of how an entity may traverse through a pinched area within the location.

In some embodiments, the visualization of a set of paths and a set of restricted regions may be provided using one or more buffers. A buffer may refer to a distance and/or an area around a path or a restricted region. For example, a buffer of ten meters may be applied to a path to create a corridor of twenty meters. As another example, a buffer of five meters may be applied to the boundaries of restricted regions. An entity that requires ten meters of lateral space to traverse an area may be able to traverse between restricted regions if the buffers of the restricted regions do not overlap each other. Buffers may be used for proximity analysis and to identify paths that come close to boundaries of restricted regions. Buffers may be associated with a type of an entity that is expected to traverse one or more paths of the set of paths. That is, different amounts of buffer may be used for different types of entities that are expected to traverse paths within a location. Buffers for the paths and/or the restricted regions may be defined automatically and/or manually. For example, buffers for the restricted regions within a location may be set by a user and/or may be set based on the type of the restricted region (e.g., buffer for a user-defined restricted region being greater than a restricted region defined based on slope, buffer for rocky mountain being greater than a buffer for grassy region to account for potential falling rocks). The visualization of the paths and restricted regions based on buffers may use colors to indicate proximity of the paths to the restricted regions. For example, buffers around the path may be visualized in green and the restricted regions may be visualized in yellow. If the boundaries of restricted regions are within the buffer of a path, such portion(s) of the path may be visualized as a green corridor with yellow protrusions. Users may be able to easily identify choke points along the path(s) by looking for yellow protrusions into the green corridor.

An interface provided by the interface engine 118 may provide visualization of the terrains within the location, such a visualization of different slopes of the terrains within the location. The view of the location may include a heatmap that uses different colors to indicate the amount of slope within the location. For example, blue color may be used to indicate no slope and red color may be used to indicate steep slope, with colors in between indicating varying degrees of slope. Colors of the heatmap may be used to identify level routes within the location. For example, a hiking path that has been cut into a steep mountainous area may be shown as a bluish line that cuts through reddish area. Such a visualization of different slopes of the terrains within the location may be used to identify paths that may be traversed within the location.

An interface provided by the interface engine 118 may enable a user to set one or more points along a route, such as a starting point, an ending point, and/or one or more intermediate points (e.g., waypoints). For example, a user may wish to identify paths that may be taken by an entity within the location where the entity is to move from the starting point to reach the ending point. The user may also wish to have the entity go through one or more waypoints while traveling from the starting point to the ending point. Based on the user's selection of point(s) along the route, the interface engine 118 may provide visualization of paths that include those selected points. The interface engine 118 may provide visualization of paths that include the starting point, the ending point, and/or one or more intermediate points. The interface may provide the shortest path that includes the starting point, the ending point, and/or one or more intermediate points. The shortest path may refer to a path that includes the shortest distance for traveling between the points and/or a path that is expected to take the least amount of time to travel between the points. The interface may enable the user to change one or more parameters relating to the entity that affects the shortest path determination. For example, the interface may include option(s) that the user may use to select the entity type and/or the mode of travel available to the entity.

The interface provided by the interface engine 118 may also enable a user to change one or more parameters relating to paths and/or restricted regions. For example, the interface may enable a user to set and/or modify values of distance thresholds for entities. The interface may enable a user to set and/or modify values that define impassible terrain, such as the slope used to determine restricted regions. The interface may enable the user to change other parameters that affect restricted region and/or path determination, such as what type of location information may be used to determine the restricted regions.

An interface provided by the interface engine 118 may provide a visual representation of how far an entity may travel within the location based on different durations of travel time. For example, different portions of the location may be visualized differently (e.g., shaded differently, patterned differently) to indicate the amount of time expected to take for an entity to reach the different portions. For example, a view of the location may be shaded differently to indicate areas of the location that an entity may reach within thirty minutes, areas of the location that the entity may reach within sixty minutes, and so forth. Other divisions of the location based on time durations are contemplated. The expected time duration calculation make take into account the paths that may be traversed by an entity (e.g., whether an entity may take a straight path or may need to take a path around a restricted area), the slope and/or height of the path that may be traversed by the entity (e.g., more time required to travel uphill, less time required to travel downhill), and/or other terrain characteristics of the paths.

An interface provided by the interface engine 118 may provide visualization of costs (e.g., temporal costs, non-temporal costs) for an entity to traverse one or more paths within the set of paths. A temporal cost may reflect a time duration expected to be needed for an entity to traverse a path. A temporal cost may be determined based on a temporal route graph (edge/node weighting). A temporal cost may reflect a combination of expected time durations needed to travel between points (weights of edges between nodes) and/or expected time durations to be spent at one or more particular points (e.g., weights of nodes). A non-temporal cost may reflect a measure of a characteristic of an environment through which the path travels. A non-temporal cost may be determined based on a two-dimensional non-temporal cost map (e.g., pixel cost). The two-dimensional non-temporal cost map may provide the non-temporal cost of moving over a point along the path based on corresponding colors/intensities of pixels associated with the point in the two-dimensional non-temporal cost map. For example, the interface may provide the time cost of an entity to traverse one or more paths and/or a non-time cost (e.g., cost based on user preference to traverse on different types of path, cost based on difficulty/risk of traversing a particular path) of an entity to traverse one or more paths.

Figure 2:
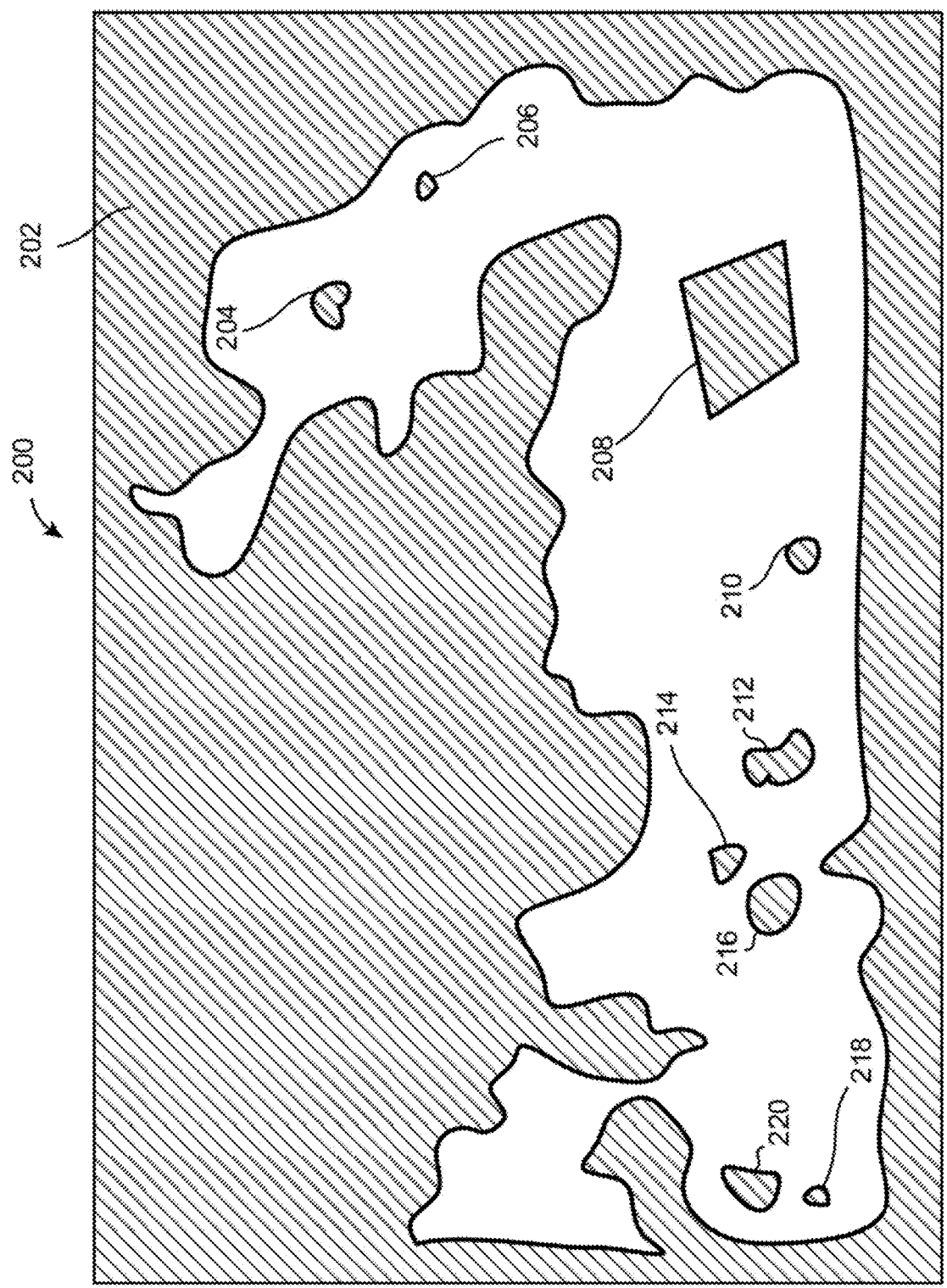
FIG. 2 illustrates an example view of restricted regions within a location, in accordance with various embodiments.

FIG. 2 illustrates an example view 200 of restricted regions within a location, in accordance with various embodiments. The view 200 may be presented via one or more interfaces, such as APIs and/or a user interface provided by the interface engine 118. The view 200 of the location may include one or more restricted regions, such as restricted regions 202, 204, 206, 208, 210, 212, 214, 216, 218, 220. The restricted regions 202, 204, 206, 208, 210,

212, 214, 216, 218, 220 may refer to regions into and/or across which an entity may not/should not move (or travel). The shape and/or boundaries of the restricted regions 202, 204, 206, 208, 210, 212, 214, 216, 218, 220 may be determined based on information that describes the location, such as terrain information that defines elevations of one or more terrains within the location and/or restriction information defines one or more restricted regions (e.g., user-defined restricted regions) within the location. For example, the restricted regions 202, 204, 206, 210, 212, 214, 218, 220 may be determined based on the boundaries of the restricted regions 202, 204, 206, 210, 212, 214, 218, 220 being too steep for traversal by an entity while the restricted regions 208, 216 may be custom (or user defined) restricted regions based on user input. A user may use the visualization of the restricted regions to determine potential paths within the location. However, such path determination may be imprecise and may not account for all possible paths within the location.

Figure 3:
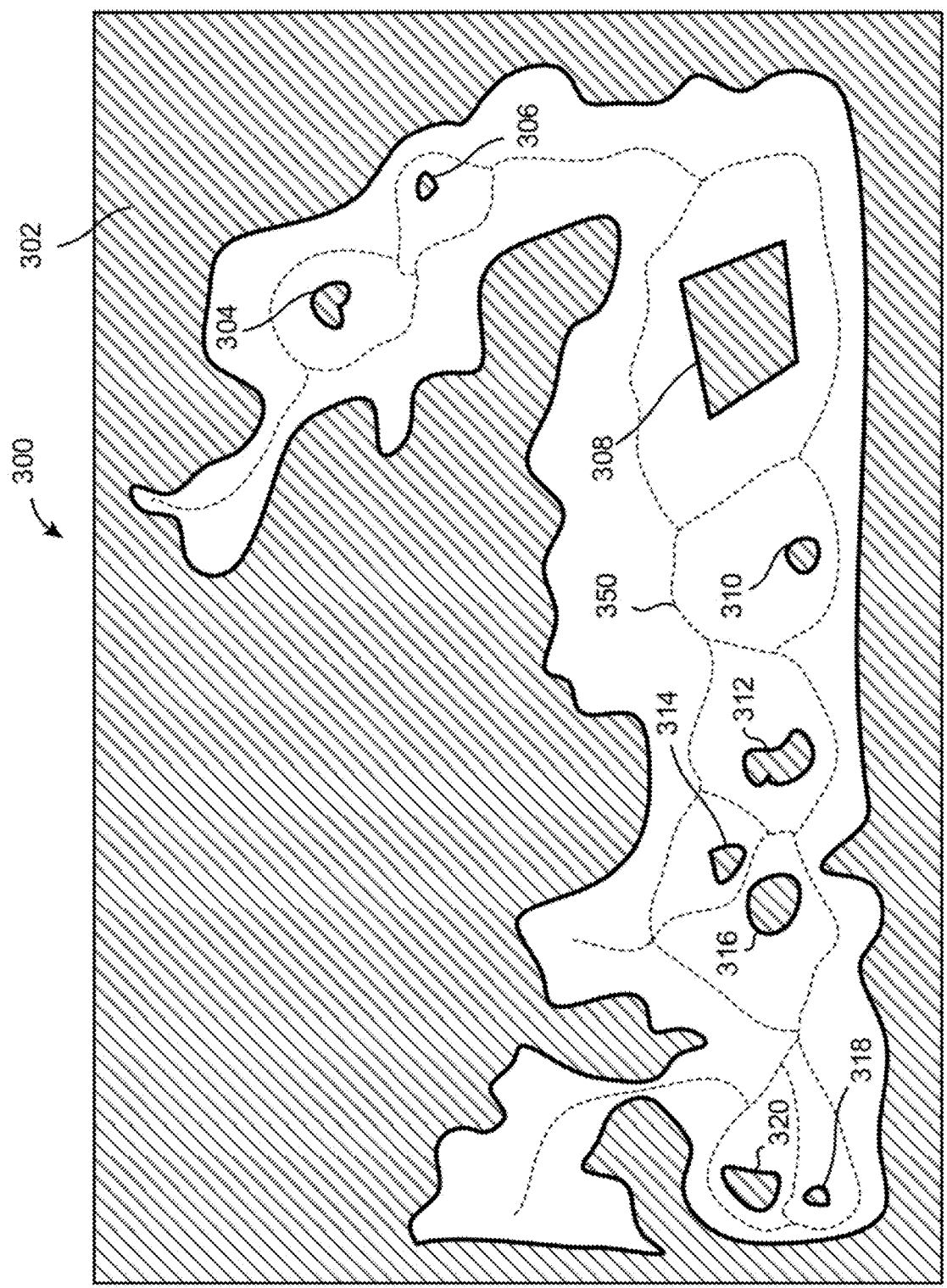
FIG. 3 illustrates an example view of paths within a location, in accordance with various embodiments.

FIG. 3 illustrates an example view 300 of paths within a location, in accordance with various embodiments. The view 300 may be presented via one or more interfaces, such as APIs and/or a user interface provided by the interface engine 118. The view 300 of the location may include one or more restricted regions, such as restricted regions 302, 304, 306, 308, 310, 312, 314, 316, 318, 320. The shape and/or boundaries of the restricted regions 302, 304, 306, 308, 310, 312, 314, 316, 318, 320 may be determined based on information that describes the location. The view 300 may also include paths 350 that are available for traversal by one or more entities. The paths 350 may be determined based on the restricted regions 302, 304, 306, 308, 310, 312, 314, 316, 318, 320 within the location, such as based on a straight skeleton analysis of the restricted regions 302, 304, 306, 308, 310, 312, 314, 316, 318, 320 within the location and/or based on distances between the boundaries of the restricted regions 302, 304, 306, 308, 310, 312, 314, 316, 318, 320 meeting a distance threshold. The view 300 may provide visualization of the paths 350 in view of the restricted regions 302, 304, 306, 308, 310, 312, 314, 316, 318, 320 within the location. Such view 300 may provide visual information on where an entity may travel within the location and/or provide information on how much the entity may deviate from the path (e.g., based on one or more buffers). For example, the path 350 may be presented using a buffer to provide a visualization of corridors within the location.

The paths 350 shown within the view 300 may change based on user input. For example, a user may insert a new restricted region, remove an existing restricted region, and/or modify a restricted region within the location, and the paths 350 may be changed to reflect the new distances between the boundaries of the restricted regions. As another example, the user may change one or more parameters relating to paths 350 and/or restricted regions 302, 304, 306, 308, 310, 312, 314, 316, 318, 320. For instance, the user may set and/or modify values of distance thresholds for an entity, and the paths 350 may be changed to reflect the distance threshold for the entity. The user may set and/or modify the value of slope used to determine restriction regions, and the restricted regions 302, 304, 306, 308, 310, 312, 314, 316, 318, 320 and/or the paths 350 may be changed to reflect the user-defined/modified slope.

Figure 4:
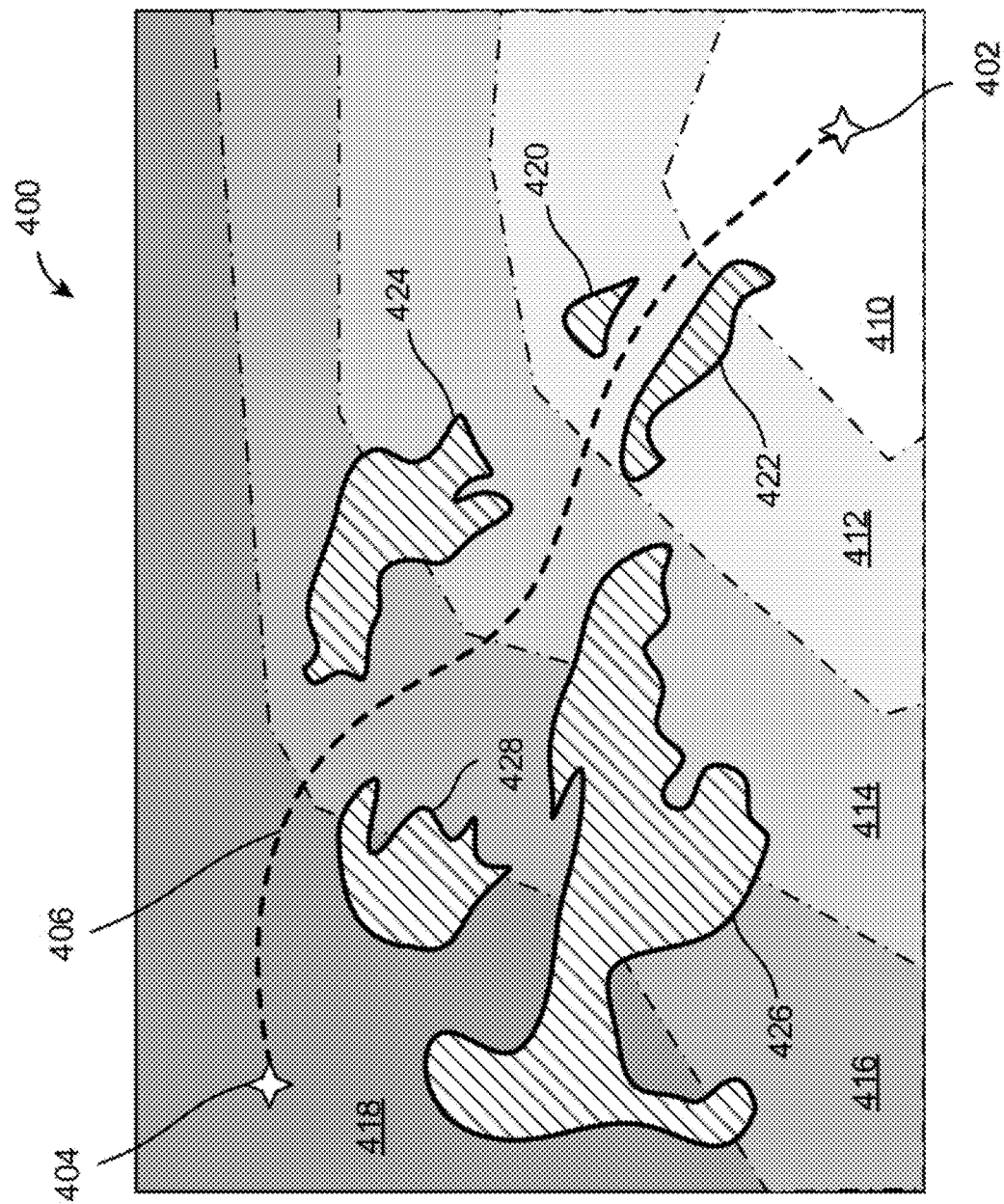
FIG. 4 illustrates an example view of a path within a location, in accordance with various embodiments.

FIG. 4 illustrates an example view 400 of a path within a location, in accordance with various embodiments. The view 400 may be presented via one or more interfaces, such as APIs and/or a user interface provided by the interface engine 118. The view 400 of the location may include one or more restricted regions, such as restricted regions 420, 422, 424, 426, 428. The view 400 may also include a path 406 that is available for traversal by one or more entities. The path 406 may be determined based on the restricted regions 420, 422, 424, 426, 428 within the location, such as based on a straight skeleton analysis of the restricted regions 420, 422, 424, 426, 428 within the location and/or based on distances between the boundaries of the restricted regions 420, 422, 424, 426, 428 meeting a distance threshold. The path 406 may include a shortest path (e.g., defined in terms of time expected to traverse the path, define in terms of distance of the path) that includes a starting point 402 and an ending point 404.

The view 400 may provide a visual representation of how far an entity may travel within the location based on different durations of travel time. For example, different portions of the location may be shaded differently to indicate the amount of time expected to take for an entity to reach the different portions. For example, a shade of a portion 410 may indicate areas of the location that an entity may reach within ten minutes, a shade of a portion 412 may indicate areas of the location that an entity may reach within twenty minutes, a shade of a portion 414 may indicate areas of the location that an entity may reach within thirty minutes, a shade of a portion 416 may indicate areas of the location that an entity may reach within forty minutes, and a shade of a portion 418 may indicate areas of the location that an entity may reach within fifty minutes. The expected time duration calculation for the portions 410, 412, 414, 416, 418 may take into account the paths that may be traversed by an entity (e.g., whether an entity may take a straight path or may need to take a path around a restricted area), the slope and/or height of the path that may be traversed by the entity (e.g., more time required to travel uphill, less time required to travel downhill), and/or other terrain characteristics of the paths.

Figure 5:
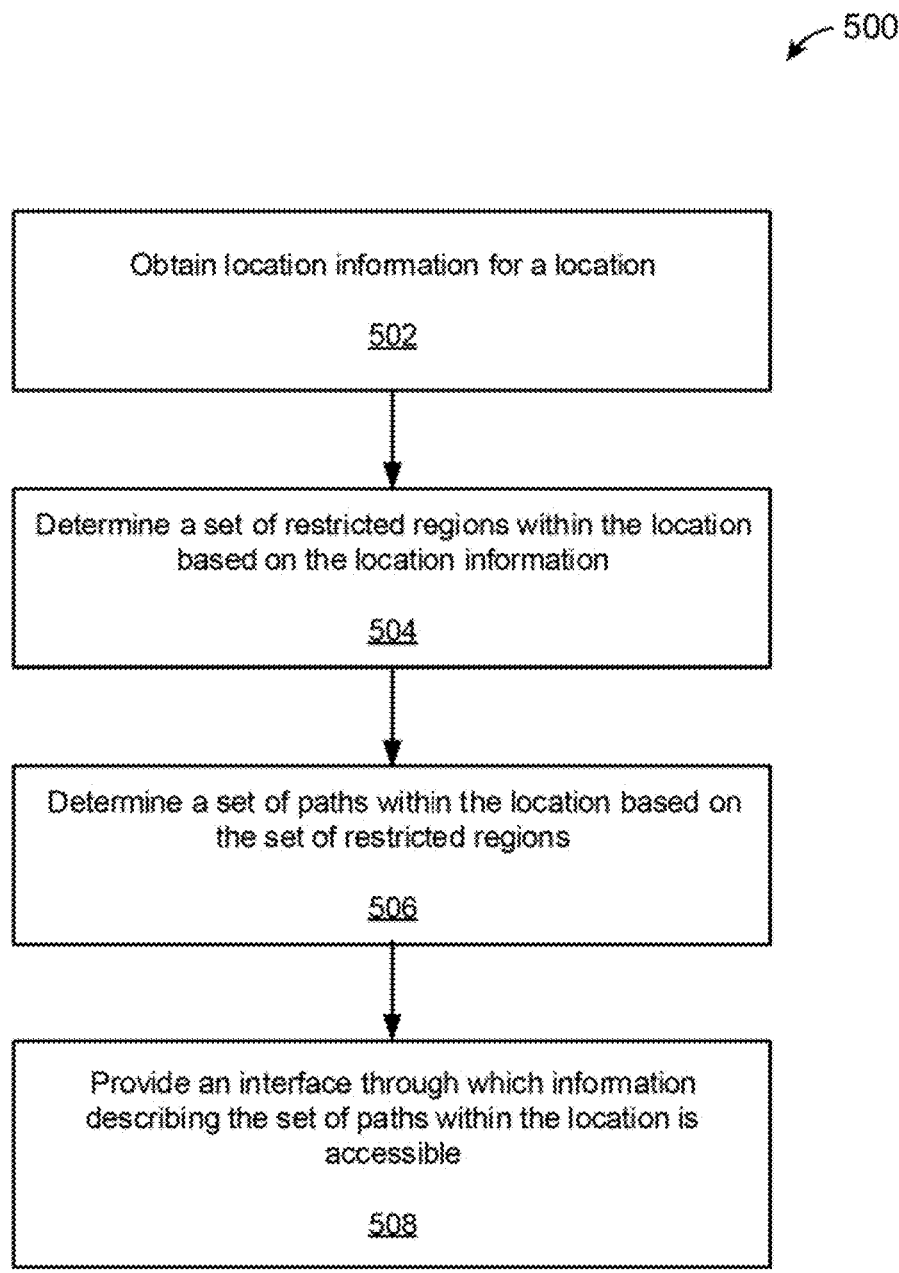
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, location information for a location may be obtained. The location information may include terrain information for the location. At block 504, a set of restricted regions within the location may be determined based on the location information. At block 506, a set of paths within the location may be determined based on the set of restricted regions. At block 508, an interface may be provided. Information describing the set of paths within the location may be accessible through the interface.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
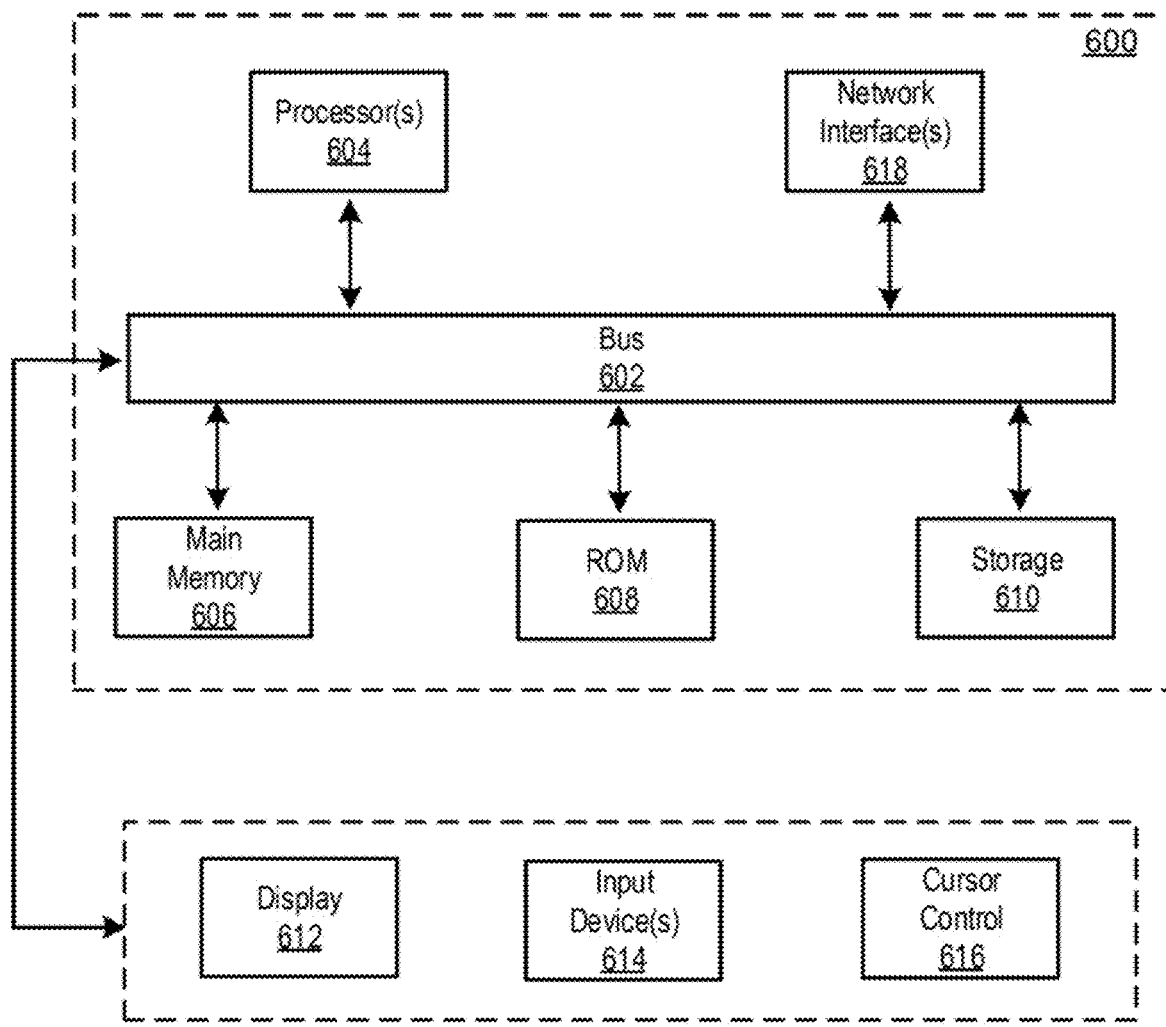
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
    one or more processors; and
    memory storing instructions that, when executed by the one or more processors, cause the system to perform:
        obtaining location information for a location, the location information including terrain information for the location, wherein the terrain information defines elevations of a terrain within the location;
        determining a set of restricted regions within the location based on the location information, wherein determining the set of restricted regions within the location comprises determining the set of restricted regions within the location based on changes in the elevations of the terrain within the location, and wherein a boundary of a restricted region within the set of restricted regions traces a line of a given slope within the terrain;
        determining a set of paths within the location based on the set of restricted regions and an entity that is expected to traverse one or more paths of the set of paths; and
        providing an interface through which information describing the set of paths within the location is accessible.

2. The system of claim 1, wherein the determining the set of paths is further based on one or more potential changes of the entity.

3. The system of claim 2, wherein the one or more potential changes of the entity include any of a change in physical size of the entity, a change in number size of the entity, or a change in a travel mode of the entity.

4. The system of claim 2, wherein the instructions further cause the system to perform:
    determining a set of potential paths within the location based on the set of restricted regions and the one or more potential changes of the entity;
    detecting at least one potential change of the one or more potential changes of the entity;
    identifying, based on the at least one detected potential change, at least one potential path of the set of potential paths; and
    updating the set of paths to include the at least one potential path of the set of potential paths.

5. The system of claim 1, wherein the given slope is defined by a single value or a range of values meeting a threshold.

6. The system of claim 5, wherein the given slope is determined based on a type of the entity that is expected to traverse one or more paths of the set of paths.

7. The system of claim 1, wherein the set of paths is determined based on distances between one or more boundaries of the set of restricted regions meeting a distance threshold.

8. The system of claim 7, wherein the distance threshold is determined based on a type of the entity that is expected to traverse one or more paths of the set of paths.

9. The system of claim 1, wherein determining the set of paths within the location further comprises determining the set of paths based on one or more changes in a size or a mode of travel of the entity during traversal of at least one of the one or more paths.

10. A method implemented by a computing system including one or more processors and storage media storing machine-readable instructions, wherein the method is performed using the one or more processors, the method comprising:

obtaining location information for a location, the location information including terrain information for the location, wherein the terrain information defines elevations of a terrain within the location;

determining a set of restricted regions within the location based on the location information, wherein determining the set of restricted regions within the location comprises determining the set of restricted regions within the location based on changes in the elevations of the terrain within the location, and wherein a boundary of a restricted region within the set of restricted regions traces a line of a given slope within the terrain;

determining a set of paths within the location based on the set of restricted regions and an entity that is expected to traverse one or more paths of the set of paths; and providing an interface through which information describing the set of paths within the location is accessible.

11. The method of claim 10, wherein the determining the set of paths is further based on one or more potential changes of the entity.

12. The method of claim 11, wherein the one or more potential changes of the entity include any of a change in physical size of the entity, a change in number size of the entity, or a change in a travel mode of the entity.

13. The method of claim 11, wherein the instructions further cause the system to perform:

determining a set of potential paths within the location based on the set of restricted regions and the one or more potential changes of the entity;

detecting at least one potential change of the one or more potential changes of the entity;

identifying, based on the at least one detected potential change, at least one potential path of the set of potential paths; and updating the set of paths to include the at least one potential path of the set of potential paths.

14. The method of claim 10, wherein the given slope is defined by a single value or a range of values meeting a threshold.

15. The method of claim 14, wherein the given slope is determined based on a type of the entity that is expected to traverse one or more paths of the set of paths.

16. The method of claim 10, wherein the set of paths is determined based on distances between one or more boundaries of the set of restricted regions meeting a distance threshold.

17. The method of claim 16, wherein the distance threshold is determined based on a type of the entity that is expected to traverse one or more paths of the set of paths.

18. The method of claim 10, wherein determining the set of paths within the location further comprises determining the set of paths based on one or more changes in a size or a mode of travel of the entity during traversal of at least one of the one or more paths.

* * * * *